Aug. 26, 1930.  L. E. WAITE  1,774,118
METHOD OF FORMING WHEELS
Original Filed Jan. 3, 1928
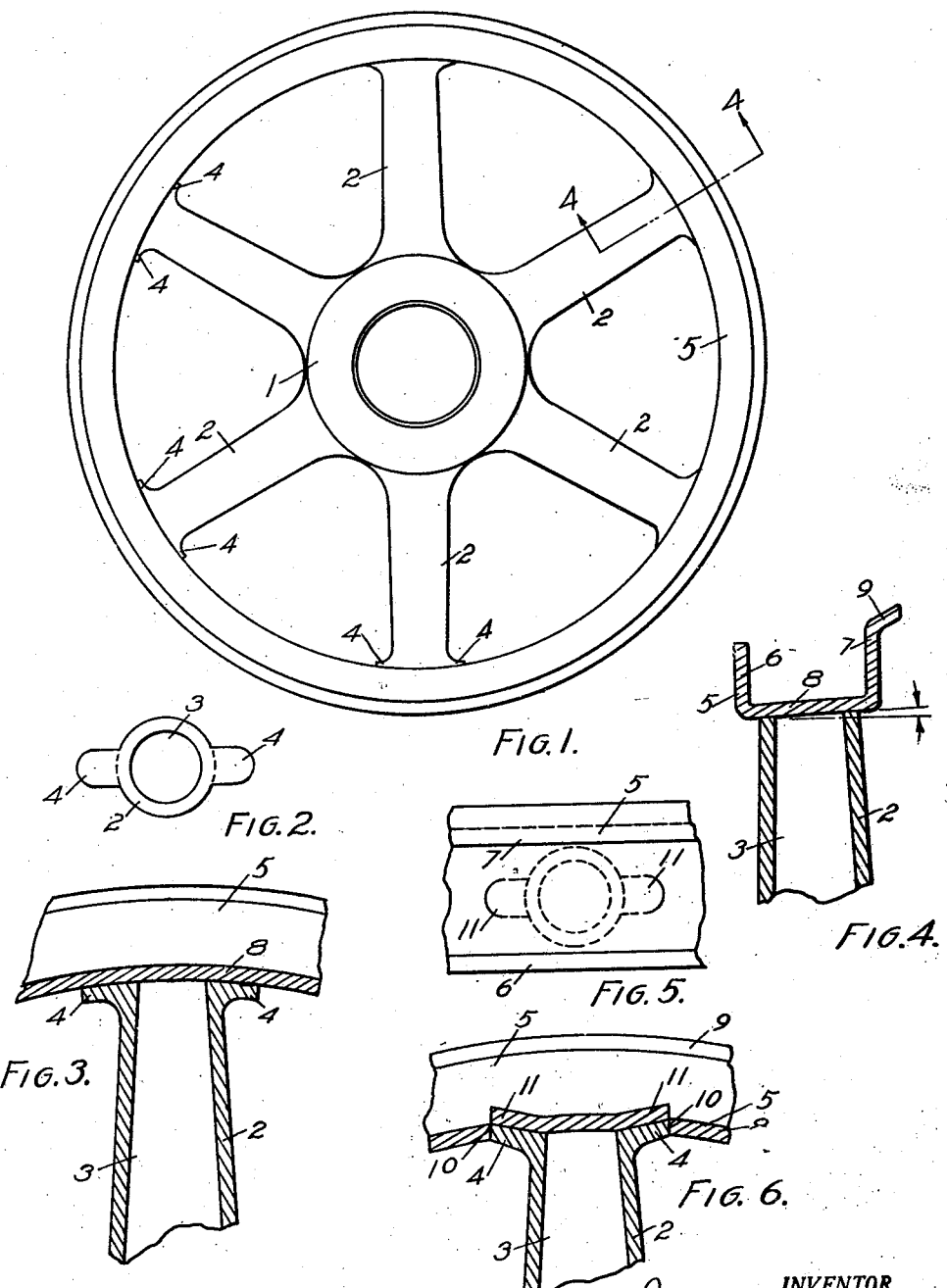

Patented Aug. 26, 1930

1,774,118

UNITED STATES PATENT OFFICE

LORENZO E. WAITE, OF ERIE, PENNSYLVANIA, ASSIGNOR TO ERIE MALLEABLE IRON COMPANY, OF ERIE, PENNSYLVANIA, A CORPORATION OF PENNSYLVANIA

METHOD OF FORMING WHEELS

Original application filed January 3, 1928, Serial No. 244,110. Divided and this application filed January 7, 1929. Serial No. 330,882.

The present invention relates to the method of forming wheels having wheel centers, usually of malleable cast iron, and a felloe formed of sheet steel and is a division of my application, Serial Number 244,110, filed Jan. 3, 1928. The making of such wheels presents some problems, particularly in making a close enough engagement of the parts of the wheel to prevent any loosening of the felloe on the spokes in use and at the same time one that does not require too close tolerances in the fabrication of the parts. Features and details of the method will appear from the specification and claims.

A preferred embodiment of the wheel illustrating the method by which it is made is shown in the accompanying drawings as follows:—

Fig. 1 shows a side elevation of a partially completed wheel.

Fig. 2 an end view of one of the spokes.

Fig. 3 a central section through a felloe and spoke prior to the attachment of the spoke to the felloe.

Fig. 4 a section on the line 4—4 in Fig. 1.

Fig. 5 a plan view of a portion of a felloe immediately over a spoke.

Fig. 6 a section on the line 6—6 in Fig. 5.

The wheel spider comprises the hub 1 and spokes 2. The spokes are ordinarily provided with openings 3 to reduce the weight. The spokes are provided with ears 4 extending laterally from their ends. Preferably these are opposed and preferably extend circumferentially of the felloe.

A felloe 5 is preferably of channel shape having the sides 6 and 7 and the inner periphery, or base plate 8. One of the sides usually has a beveled edge 9 for receiving a tire rim.

In assembling the wheel, the spider is placed within the felloe, the ends of the spokes engaging the inner periphery of the felloe. The ears are then forced outwardly into the felloe, the effect of which is to cut a lip 11 in the felloe and force the ears into an opening 10 thus formed. The edges of the walls of the openings have a contour exactly and intimately fitting the edges of the ears and the edges of the ears operating in connection with the walls of the opening lock the felloe against circumferential movement on the spokes, or disengagement sidewise—in fact, there is a very substantial assembly of the parts. Further the sinking of the edges of the ears into the felloe makes it possible to make a comparatively smooth joint between the ends of the spoke and the felloe.

Any ordinary press may be used for forcing the ears into the felloe, one member of the press engaging the projecting ears, as illustrated in Fig. 3, and the other member of the press operating on the inside of the felloe and opposing the first-mentioned member, the member within the felloe having the usual openings for receiving the lip 11.

What I claim as new is:—

1. The method of forming wheels which consists in forming an annular felloe and a wheel spider, the spokes of which are adapted to engage the inner periphery of the felloe; forming a laterally extending ear upon the outer end of some of the spokes, placing the felloe and spokes together and forcing the ears into the felloe.

2. The method of forming wheels which consists in forming an annular felloe and a wheel spider, the spokes of which are adapted to engage the inner periphery of the felloe forming a laterally extending ear upon the outer end of each spoke, placing the spokes within the felloe and forcing the ears into the felloe.

3. The method of forming wheels which consists in forming an annular felloe and a wheel spider, the spokes of which are adapted to engage the inner periphery of the felloe; forming a laterally extending ear upon the outer end of some of said spokes, placing the felloe and spokes together and forcing the ears into the felloe cutting an opening in the felloe having walls conforming to the edge of the ear.

4. The method of forming wheels which consists in forming an annular felloe and a wheel spider, the spokes of which are adapted to engage the inner periphery of the felloe forming a laterally extending ear upon the outer end of each spoke, placing the spokes within the felloe and forcing the ears into the felloe cutting openings in the felloe having walls conforming to the edges of the ears.

5. The method of forming wheels which consists in forming an annular felloe and a wheel spider, the spokes of which are adapted to engage the inner periphery of the felloe forming ears extending laterally upon opposite sides at the outer ends of some of the spokes, placing the felloe and spokes together, and forcing the ears into the felloe.

6. The method of forming wheels which consists in forming an annular felloe and a wheel spider, the spokes of which are adapted to engage the inner periphery of the felloe forming ears extending laterally upon opposite sides at the outer ends of some of the spokes, placing the felloe and spokes together, and forcing the ears into the felloe cutting openings in the felloe having walls conforming to the edges of the ears.

In testimony whereof I have hereunto set my hand.

LORENZO E. WAITE.